(12) United States Patent
Emery

(10) Patent No.: US 7,710,118 B2
(45) Date of Patent: May 4, 2010

(54) RESONANT PULSE INDUCTION METAL DETECTOR THAT TRANSMITS ENERGY FROM HIGH VOLTAGE FLYBACK PULSES

(76) Inventor: David Emery, 424 Clement Ave., Charlotte, NC (US) 28204-2328

( * ) Notice: Subject to any disclaimer, the term of this patent is extended or adjusted under 35 U.S.C. 154(b) by 395 days.

(21) Appl. No.: 11/891,718

(22) Filed: Aug. 13, 2007

(65) Prior Publication Data

US 2009/0045813 A1 Feb. 19, 2009

(51) Int. Cl.
*G01V 3/11* (2006.01)
*G01R 33/12* (2006.01)
(52) U.S. Cl. ........................ 324/326; 324/239
(58) Field of Classification Search ................ None
See application file for complete search history.

(56) References Cited

U.S. PATENT DOCUMENTS

| 4,030,026 | A |   | 6/1977 | Payne | |
|---|---|---|---|---|---|
| 4,486,713 | A | * | 12/1984 | Gifford | 324/329 |
| 4,514,692 | A |   | 4/1985 | Johnson et al. | |
| 5,414,411 | A |   | 5/1995 | Lahr | |
| 5,576,624 | A | * | 11/1996 | Candy | 324/329 |
| 6,529,006 | B1 | * | 3/2003 | Hayes | 324/326 |
| 2007/0046288 | A1 |   | 3/2007 | Westersten | |
| 2008/0224704 | A1 | * | 9/2008 | Westersten | 324/326 |

* cited by examiner

*Primary Examiner*—Jay M Patidar
(74) *Attorney, Agent, or Firm*—James Creighton Wray; Meera P. Narasimhan

(57) ABSTRACT

A metal detector transmitting high current pulses and employing the high voltage back EMF signals which occur at their termination. The method employed uses a resonant tuned receive coil which provides a major improvement in the depth of detection of metallic objects and interference rejection over current time and frequency domain metal detectors.

9 Claims, 3 Drawing Sheets

RESONANT PULSE INDUCTION METAL DETECTOR THAT TRANSMITS ENERGY FROM HIGH VOLTAGE FLYBACK PULSES

FIELD OF THE INVENTION

The invention relates generally to a metal detector.

BACKGROUND OF THE INVENTION

There are two main types of hand held metal detectors in common use. A first type of metal detector is referred to as an Induction Balance detector or more commonly a very low frequency "VLF" metal detector, as they operate using very low frequencies. That type of metal detector operates in the frequency domain and uses a sinusoidal transmit signal to transmit a varying magnetic field.

A second type of metal detector called a Pulse Induction or "PI" detector operates in the time domain. The PI metal detector transmits a magnetic field due to a transmit coil being energized by high current pulses.

Most VLF metal detectors use a searchcoil assembly which contains a transmit and a receive coil and a feedback or bucking coil. The coils are physically arranged in such a way as to cause a null in the receive coil to the signal from the transmit coil. Metallic objects entering the searchcoil's field upset the balance, causing a signal in the receive coil. The received signal has a phase and amplitude which is dependent on the type of metal as well as the size and shape of the metallic object.

As the transmit signal is sinusoidal, many metal detectors incorporate the transmit coil into an oscillator circuit, with the transmit coil becoming the oscillator's tank circuit. The continuous sinusoidal signal provides a phase reference for one or more synchronous demodulators or synchronous sampling circuits which output a DC signal containing information regarding the phase and amplitude of the receive signal.

By adjusting the clock phase of the synchronous demodulators or sampling circuits relative to the sinusoidal transmit reference, it is possible to obtain a DC signal which has essentially no component due to mineral ground. The synchronous demodulators or synchronous sampling circuits output a DC signal which is, for example, positive for non ferrous targets and negative for ferrous targets.

Only positive signals are chopped at an audio frequency and amplified to a speaker or headphones to indicate the presence of a metallic object which falls within a predetermined range.

The positive or negative DC signal may also be applied to a meter.

Pulse Induction metal detectors operate by switching high current pulses through a transmit coil. The current causes a magnetic field to surround the transmit coil. The field causes eddy currents to flow on the surface of metallic objects. Either the same coil used for transmit or a separate receive coil picks up signals from the metallic targets after the transmit pulses terminate. The received signal is sampled one or more times and processed so as to provide a DC signal to cause a voltage controlled oscillator to output an audio amplitude and/or a frequency change of the audio output stage to indicate the presence of a metallic object.

A further detailed description of the above metal detector technologies is not provided, as both methods are well known in the art.

Both Induction balance—VLF and Pulse Induction "PI" metal detectors have a number of drawbacks.

One drawback with VLF metal detectors is that they are very difficult to build using a resonant tuned receive coil. Small temperature changes in the searchcoil can translate into a phase shift of the receive signal, which in turn causes errors in the ability of the metal detector to cancel signals due to mineral ground and to discriminate against unwanted metallic objects. The effect however of using a non-resonant tuned coil is a major reduction in the metal detector's sensitivity and poor interference rejection capabilities.

Another drawback of most VLF metal detectors is that their detection depth is limited due to the low power of the transmitted signal.

Pulse Induction or PI metal detectors generally have greater depth capabilities than VLF metal detectors. PI metal detectors, however, have, at best, only a very limited discrimination ability.

Minerals such as iron oxides in the ground also adversely effect a metal detector's discrimination ability often to the point where discrimination between different metallic objects is not possible.

Accordingly, there is a need for a metal detector which has the ability to work with a tuned searchcoil, has a major depth capability, superior noise rejection and the ability to discriminate against a range of unwanted metallic objects which are buried in highly mineralized soil.

SUMMARY OF THE INVENTION

In a PI detector, high voltage back electromotive force, back EMF, commonly referred to as a flyback pulse, follows the termination of each transmit pulse. The energy in this pulse is not used by pulse induction metal detectors and is thus wasted.

The present invention employs the use of high voltage back EMF signals caused by pulsing high currents through a transmit coil and providing discrimination of ferrous and non ferrous objects which are buried in mineralized ground.

Unlike a Pulse Induction or PI metal detector which wastes the flyback pulse energy in the transmit coil, it is this energy which is used by the Resonant Pulse Induction or RPI metal detector of the present invention to interrogate metallic objects in the field of the searchcoil.

The invention described and claimed herein is closely related to both PI and VLF type metal detectors. It is an easy matter to convert the RPI detector to a conventional PI detector. Indeed, a hybrid of the two types of metal detector can be made by making only minor modifications to the invention being claimed.

The RPI detector uses a tuned receive coil. The transmit and receive coil form a balanced searchcoil arrangement.

A decaying sinusoidal oscillation occurs in the tuned receive coil after the termination of each high voltage flyback pulse in the transmit coil if the balance of the searchcoil is disturbed by the presence of a metallic object.

The high voltage back EMF or flyback pulse in the transmit coil can be measured in hundreds or even thousands of volts. The RPI method provides a metal detector with extreme depth capabilities.

As the receive coil is part of a parallel tuned circuit, the resonant frequency of the decaying oscillation is due solely to its inductance and the value of the resonating capacitor.

Circuitry provides accurate timing for two or more sampling circuits regardless of changes in the tuned receive coil's resonant frequency which are either intentional or due to temperature drift.

One object of the present invention is to provide new and useful metal detector apparatus which has greater sensitivity and vastly improved depth capabilities.

Another object of the present invention is to provide a means which may substantially eliminate interference such as radio transmissions and electrical noise by using a tuned receive coil.

Still another object of the invention is to provide a new and useful metal detector apparatus which discriminates between different kinds of metals while not being affected by ground mineralization.

Still another object of the invention is to provide new and useful metal detector apparatus which has the capability of controlling the timing of a number of synchronous sampling circuits even when the resonant frequency of the receive coil is changed or changes due to temperature variations.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
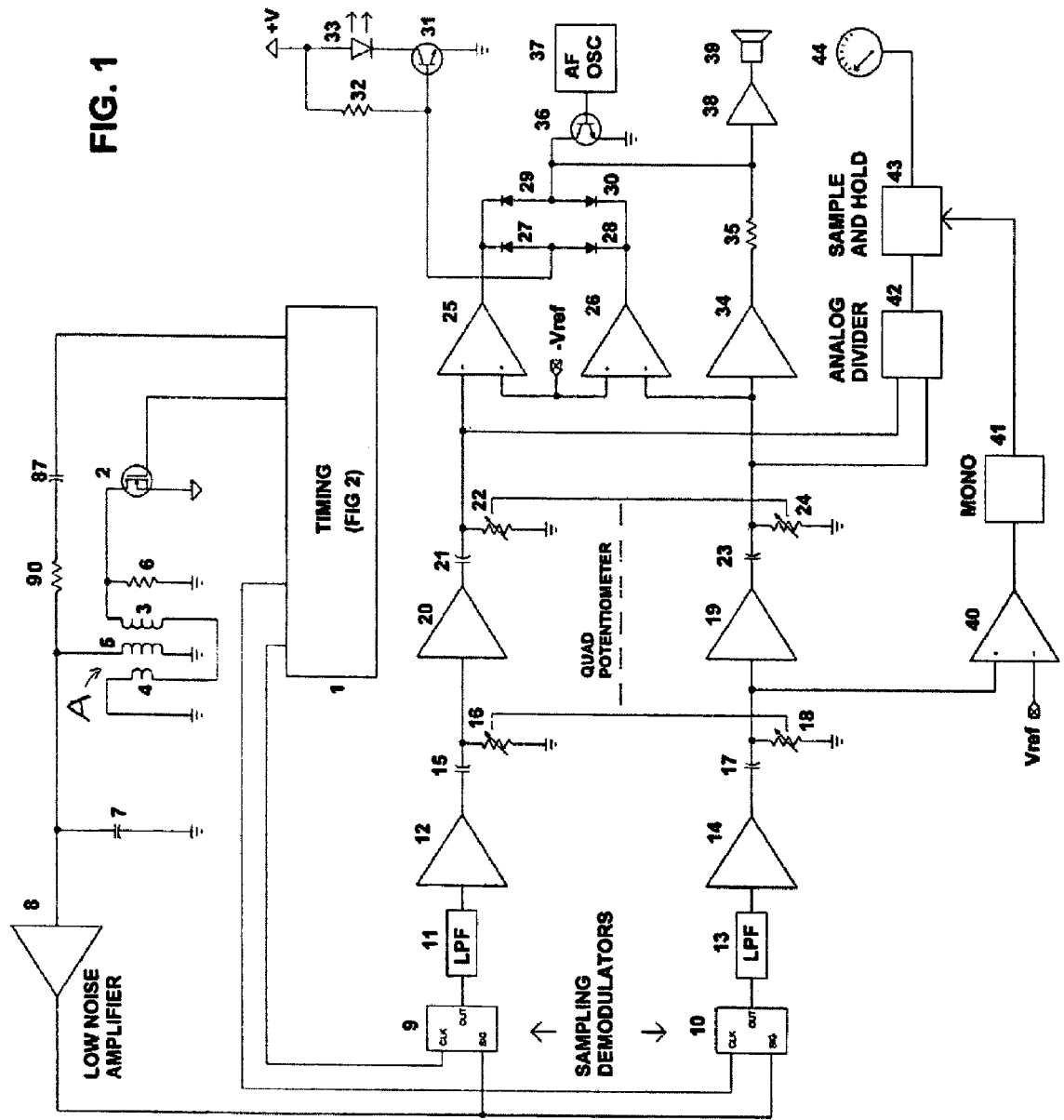
FIG. 1 is an overall block diagram of the invention
Figure 3:
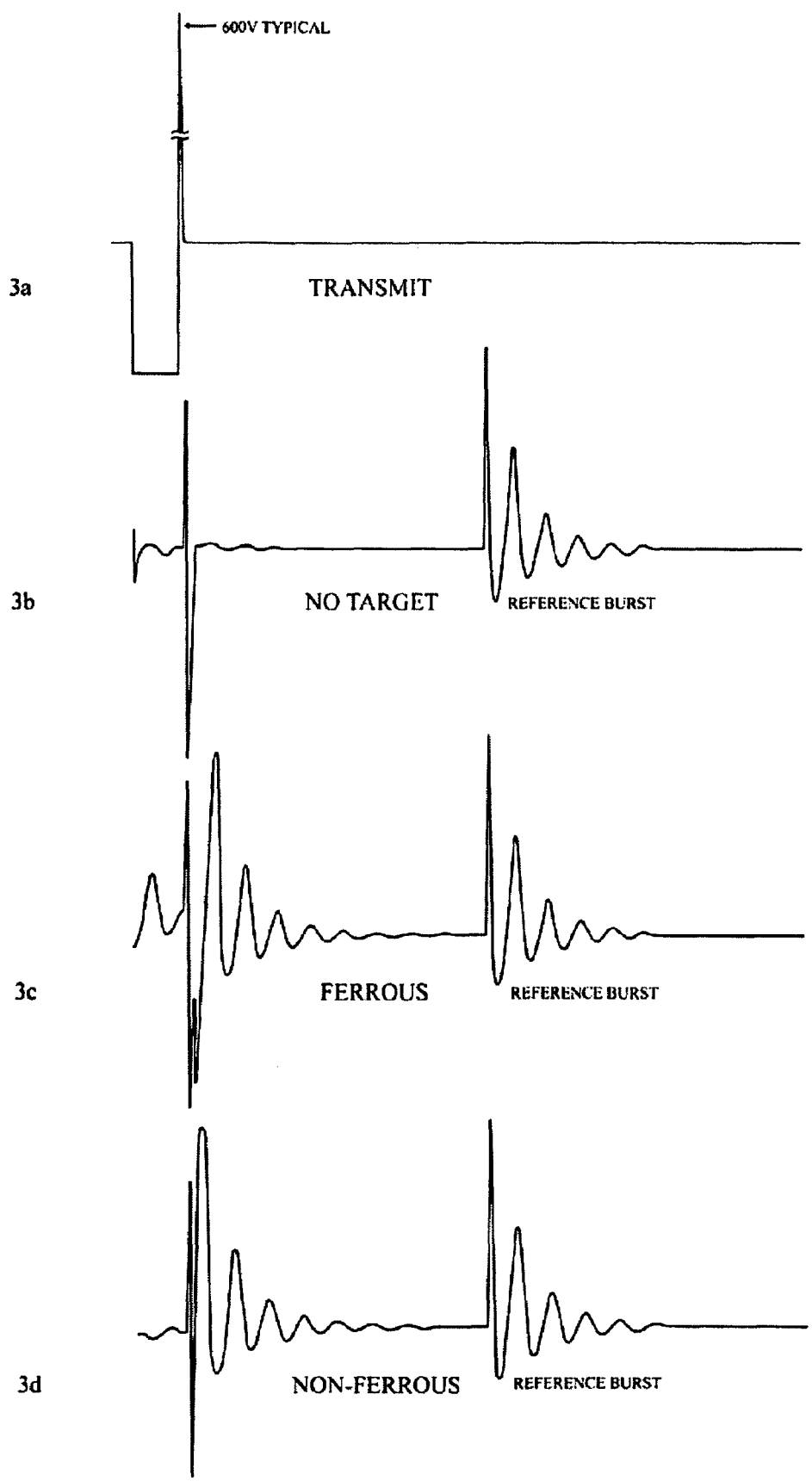
FIG. 3 is a drawing of the waveforms associated with the invention.

Referring to FIG. 1, a timing generator 1 provides pulses with a typical duration of 50 µs as shown in FIG. 3a at a frequency of between approximately 200 Hz to 1 KHz. The pulses drive a high power field effect transistor or FET 2, which switches transmit coil 3 and bucking coil 4 to the negative power supply, thus energizing them.

Resistor 6 provides a degree of damping to transmit coil 3 and bucking coil 4.

Capacitor 7 resonates the receive coil 5 to form a parallel tuned circuit.

The coil assembly A includes transmit coil 3, bucking coil 4 and receive coil 5. The coil assembly is configured as a balanced coaxial coplanar searchcoil which is well known in the art.

The coil assembly is balanced to provide little or no signal output from the receive coil during the transmit periods in the absence of a metallic target. Other types of balanced coil assemblies can be used, but a balanced coaxial coplanar assembly is preferred.

The termination of each transmit pulse shown in FIG. 3a causes a high voltage flyback voltage to be generated. The flyback pulse is used in the invention to provide the useful energy transmitted from the searchcoil.

A metallic target in proximity to the searchcoil will unbalance it and cause a decaying sinusoidal signal in receive coil 5 after the termination of the flyback pulse which occurs after each transmit pulse as shown in FIGS. 3c and 3d.

The phase and amplitude of this decaying sinusoidal signal as measured to the end of the flyback pulse is dependent on the type of metal and its size and shape.

FIG. 3b shows the receive signal when no metallic objects are present in the field of the searchcoil.

FIG. 3c shows a typical receive waveform when a ferrous metallic object is in the field of the searchcoil.

FIG. 3d shows a typical receive waveform when a non-ferrous metallic object is in the field of the searchcoil. Note the phase difference of the decaying sinusoidal signal compared to FIG. 3c.

Referring to FIG. 1, the decaying sinusoidal signal in receive coil 5 is amplified by a low noise amplifier 8 and is provided to sampling circuits 9 and 10. The outputs of the sampling circuits are low pass filtered by filters 11 and 13 and are buffered by buffer amplifiers 12 and 14.

Sampling demodulator circuits 9 and 10 are clocked by a fast sample clock of approximately 1-5 µs duration once during each receive period to interrogate the decaying sinusoidal oscillation due to the searchcoil being unbalanced by a metallic object in its proximity. Sample circuit 10 is clocked at a time when the reactive signal component of the mineralized ground is at its zero crossing point.

The output of sampling demodulator 10 is primarily caused by the resistive component of a metallic target. This signal is the same polarity for both ferrous and non-ferrous metallic targets. It is used in the invention as an all metal type of indication or "all metal signal".

The output of sampling demodulator 9 is primarily caused by the reactive component of a metallic target. This signal has a 180 degree phase difference between ferrous and a non-ferrous metallic targets which causes either a positive or negative polarity output.

The ratio of the amplitude of the resistive to the reactive components and the exact phase of the receive signal is dependent on the type of metal as well as the size and shape of the metallic object and the frequency of the sinusoidal signal.

By adjusting the timing of the clock pulse to demodulator 10, it is possible to obtain a signal which is free of the mostly reactive signal caused by ground minerals. The sample clock is adjusted to occur at the zero crossing point of the signal caused by the ground mineralization at the location the metal detector is being used.

The resulting all metal signal is now free of the effects of the ground minerals and has the same polarity for ferrous and non-ferrous metallic targets.

By adjusting the timing of the clock pulse to demodulator 9, it is possible to obtain a positive going signal for non ferrous and a negative going signal for ferrous metallic objects.

This range can be expanded to provide a range of unwanted ferrous and non-ferrous metallic objects to cause a negative going signal while wanted non ferrous signals cause a positive going signal. Negative going signals cut off the audio output of the metal detector, thus providing a rejection of unwanted metallic objects such as iron, nails and thin aluminum foil.

The discrimination signal as provided becomes totally unreliable in the presence of mineralized ground. This problem can generally be overcome by taking advantage of the fact that the signal from mineralized ground is generally slowly changing and can be removed by high pass filtering both the all metal and the discrimination channels. This method is commonly used in VLF metal detectors.

The discrimination signal from sampling demodulator 9 is low pass filtered by low pass filter 11 and buffered by amplifier 12 before being applied to a first differentiator circuit comprising capacitor 15 and resistor 16. The signal is buffered and amplified by amplifier 20. The output of amplifier 20 is applied to a second differentiator comprised of capacitor 21 and resistor 22. The resulting signal is applied to the inverting input of voltage comparator 25.

The ground balanced, all metal signal from sampling demodulator 10 is low pass filtered by filter 13 and buffered by amplifier 14 before being applied to a first differentiator circuit comprising capacitor 17 and resistor 18. The signal is buffered and amplified by amplifier 19. The output of amplifier 19 is applied to a second differentiator comprised of capacitor 23 and resistor 24. The signal is applied to the inverting input of voltage comparator 26 and buffer amplifier 34.

Note that resistors 16, 18, 22 and 24 are variable and are ganged together. The four variable resistors can be either a ganged potentiometer or four integrated circuit, electronic potentiometers.

The variable resistors can be adjusted by the operator to allow a faster or slower movement of the searchcoil to be chosen to suit the prevailing ground mineral conditions.

The outputs of comparators 25 and 26 are normally low due to a negative reference voltage being applied to the non-inverting inputs of both comparators. The junctions of diodes 27 and 28 as well as 29 and 30 are held low if either or both comparators 25 or 26 have a low output.

The low comparator output/s remove the base bias voltage from NPN transistor 31 which is provided by resistor 32, thus turning the transistor and LED indicator lamp 33 off. The audio input to amplifier 38 is also reduced below a level to where amplifier 38 can output an audio indication signal.

Metallic objects which cause a negative output from demodulator 9 will cause comparator 25 to have a low output. The output from demodulator 10 will be positive during this time. The effect is to keep transistor 36 off and inhibit the audio indication signal from amplifier 34. The low output from comparator 25 also removes the base voltage from transistor 31 keeping it, and the LED indicator lamp 33 switched off.

Metallic objects which cause a positive output from both sampling demodulators 9 and 10 cause the junctions of diodes 27 and 28 as well as diodes 29 and 30 to be open circuits. Base current now flows into transistor 31 through resistor 32 turning it on and causing LED indicator lamp to turn on. The positive going all metal signal from buffer amplifier 34 is now chopped by transistor 36 into audio pulses.

Transistor 36 chops the positive voltage from buffer amp 34. Transistor 36 is driven by audio oscillator 37. The chopped audio signal is amplified by amplifier 38 which drives loudspeaker 39 to provide an audio indicator signal.

Ratiometric Signal Indicator

Figure 2:
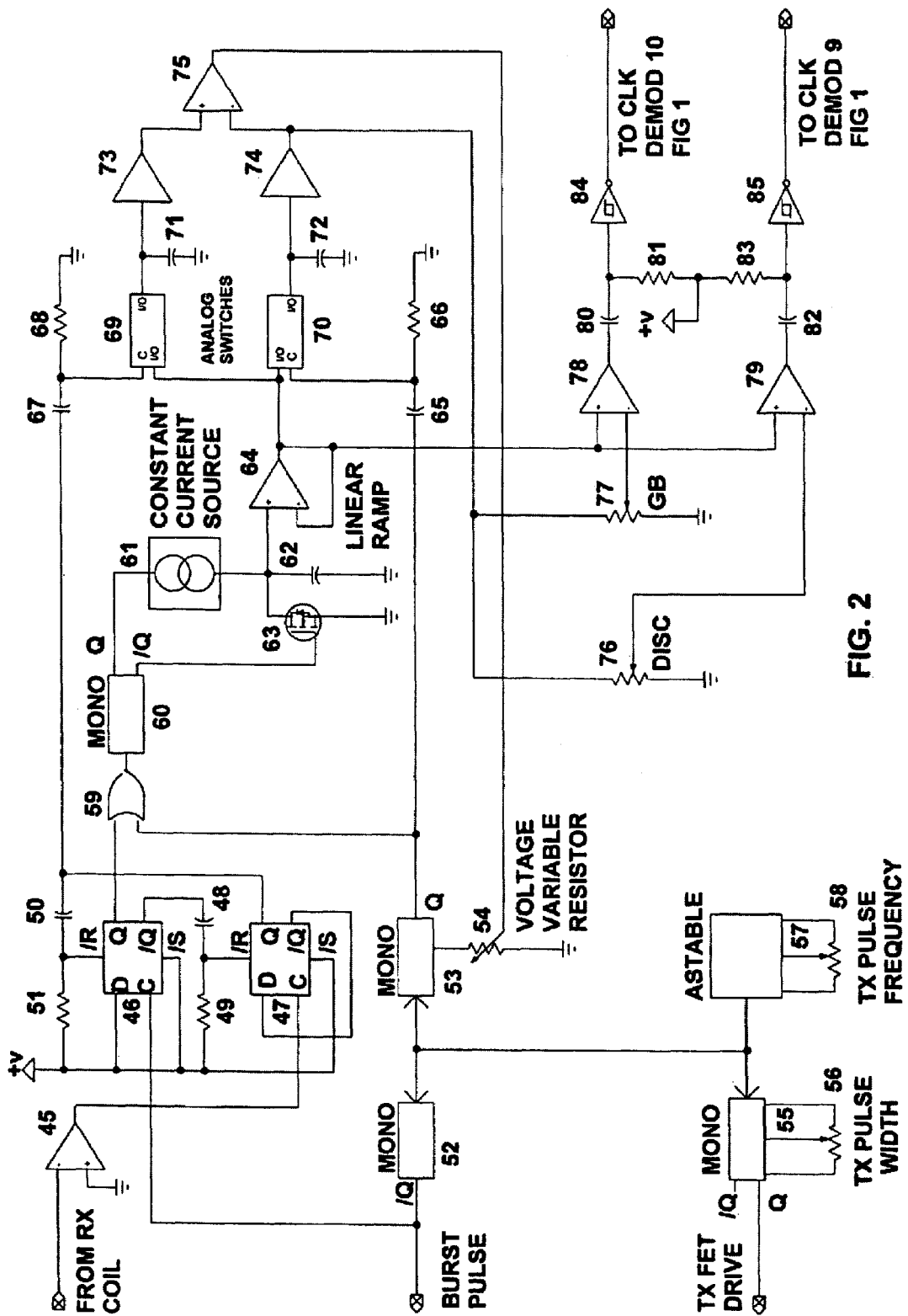
FIG. 2 is an overall block diagram of the timing circuit of the invention.

The ratio of the resistive and the reactive signal components are measured and displayed to the operator as a reading on meter 44. To use this feature, the discrimination potentiometer 76 of FIG. 2 is set to where ferrous metallic objects cause a negative output signal and non-ferrous metallic targets cause a positive output from demodulator 9.

Analog divider 42 outputs a voltage related to the ratio of the signals from both demodulators 9 and 10. Comparator 40 squares the signal from demodulator 10 after the first differentiator comprising capacitor 17 and resistor 18. This signal is primarily resistive and is in quadrature to the signal at the output of the second differentiators comprised of capacitor 23 and resistor 24 and capacitor 21 and resistor 22.

The squared output of comparator 40 fires a monostable which provides a gating clock to sample and hold 43 at a time when the signals at the outputs of the second differentiators are at a peak value. The output of the sample and hold is output to meter 44.

The ratios of the voltage peaks and the polarity of the signal from demodulator 9 is an indication of the type of metal and the possible identity of the metallic object which the searchcoil is passing over.

Precision Sample Reference

As the resonant frequency of the tuned receive coil is completely independent of any timing signals, the problem remains as to how to provide a precision reference to clock the sampling circuits. The problem is solved by part of the timing circuit 1. Refer to FIG. 2.

Astable 57 clocks monostable 55 to provide a continuous source of transmit pulses. Potentiometer 58 sets the transmit pulse repetition frequency. Monostable 55 sets the transmit pulse width which is set by potentiometer 56.

At a time after the termination of the transmit pulse and after the decaying sinusoidal signal from metallic objects (when present) has substantially decayed, the timing circuit injects a short pulse of about 2 µs duration through capacitor 89 and resistor 90 in FIG. 1 directly into receive coil 5. The pulse shocks the receive coil into a burst of damped oscillation as shown in FIG. 3b, FIG. 3c and FIG. 3d.

The damped oscillation or "reference burst" is not effected by metallic objects being present in the searchcoil's field, as it is applied directly to the receive coil at a time when the current through the transmit coil is zero.

The damped oscillation or reference burst is measured to provide a reference for the sampling circuits.

Flip flop 46 is clocked by the leading edge of a reference pulse from the burst pulse timing monostable 52. This sets the Q output of flip flop 46 high and its /Q low. The transition of /Q to low is coupled to the reset of flip flop 47 via a differentiator made from capacitor 48 and resistor 49. This rapidly resets flip flop 47.

s previously stated in reference to FIG. 1, the same reference pulse is injected into the receive coil via capacitor 89 and resistor 90. This shock excites receive coil 5 and causes a damped sinusoidal oscillation. The oscillation starts with a sinusoidal signal starting at zero degrees and going positive.

Comparator 45 squares the sinusoidal oscillations from the receive coil into a series of pulses. Each time the sinusoidal burst signal goes through its negative zero crossing, a positive going pulse is output from the comparator.

The first pulse from comparator 45 clocks Q of flip flop 47 high. The second pulse clocks flip flop 47 low, as its /Q output is connected to the D input. The transition of Q to low is coupled to the reset of flip flop 46 by capacitor 50 and resistor 51, which resets flip flop 46 to Q=low.

The result of this is to provide a single pulse of a width equal to 360 degrees or one cycle of the reference burst from the Q output of flip flop 46.

The pulse from flip flop 46 is passed to OR gate 59. The positive edge of the pulse from the OR gate triggers monostable 60 setting its Q output to a logic high. The logic high enables constant current source 61, which linearly charges capacitor 62.

Constant current source 61 and capacitor 62 form the charging part of a linear ramp circuit. Capacitor 62 is discharged by FET 63 when monostable 60 times out. Buffer amplifier 64 buffers the ramp.

Monostable 53 has its timing adjusted by voltage controlled resistor 54.

The output of monostable 53 is connected to a differentiator circuit consisting of capacitor 65 and resistor 66. The differentiator provides a sample clock pulse with a duration in the range of 2 µs-5 µs to analog switch 70.

The Q output of flip flop 47 is connected to a differentiator circuit consisting of capacitor 67 and resistor 68. The differentiator provides a sample clock in the range of 2-5 µs to analog switch 69.

Both analog switches sample and hold a voltage from the linear ramp and apply their sampled voltages to difference amplifier 75 via buffer amplifiers 73 and 74. The output of difference amplifier 75 is now either positive, negative or at zero volts depending on the voltage being higher or lower on capacitor 71 than the voltage on capacitor 72 or if the two voltages are equal.

The output of difference amplifier 75 is thus an error voltage which adjusts voltage controlled resistor 54 until the pulse width outputs of flip flop 46 and monostable 53 are equal. The above method automatically adjusts the pulse width of monostable 53 to that of a pulse from flip flop 46 even though these two pulses occur during completely different time intervals. The ramp period equals 360 degrees of one sinusoid from the reference burst.

Buffer amplifier 74 outputs the buffered voltage from capacitor 72. When both monostables have the same pulse width then the voltage on either capacitor 71 or 72 represents a ramp voltage time equal to 360 degrees of one sinewave of the sinusoidal reference burst.

The linear ramp is applied to the inverting inputs of voltage comparators 78 and 79. The voltage from buffer amplifier 74 is divided by potentiometers 76 and 77. The wipers of the potentiometers are applied to the non-inverting inputs of comparators 78 and 79.

The comparators now switch states from high to low according to the ratio of the peak ramp voltage to the divided voltage on the comparators inverting inputs.

Two half monostables formed by capacitors 80 and 82, resistors 81 and 83 and Schmitt triggers 84 and 85 both output a short sample clock pulse at the times set by potentiometers 76 and 77. This method provides sampling pulses which can be set over a wide range.

The accuracy of the sampling pulse timing is not effected by the resonant frequency of the receive coil.

A microcomputer with an internal counter/timer can be used to measure the time from the burst pulse which is used to shock excite the receive coil and a second zero crossing of the squared damped oscillation of the burst signal. The same microcomputer can also provide the sample clock signals to the demodulators.

The invention provides a metal detector which transmits energy from high voltage flyback pulses which occur at the termination of each of a continuous train of high current pulses. A transmit coil is energized by a continuous train of high current pulses. A receive coil is connected to a parallel capacitor forming a parallel tuned circuit. Signals intercepted by the receive coil are sampled and processed. Indicators alert the operator of the equipment when the signal processing yields results that meet predetermined criteria.

The transmit and receive coils are balanced for a minimum output from the receive coil when no metallic objects are in the transmitted magnetic field.

A reference burst or decaying sinusoidal oscillation is generated by a voltage pulsed directly into the receive coil at a time when signals from metallic objects are substantially zero.

Accurate measurement of a cycle of the reference burst produces accurate timing and sample demodulator clock pulse generation.

Sampling pulses are derived for the processing so that the signals intercepted by the said receive coil can be separated into resistive and reactive signal components.

High pass filtering of the resistive and reactive signal components uses two differentiator circuits in each signal channel and causes an output indication only when both signals are of the same polarity, thus indicating the presence of a non ferrous metallic object in the field produced by the transmit coil.

The differentiator circuits are tunes by ganged potentiometers or electronic chip resistors.

The ratio of the resistive and the reactive components of the metallic object are displayed as an indication as to the nature of the metallic object in the field of the searchcoil.

The invention provides exciting the transmitter coil of a metal detector with high current pulses, employing resulting high voltage flyback pulses as the primary source of transmit energy and intercepting signals from metallic objects in the transmitted magnetic field using a receive coil tuned to a resonant frequency with a parallel capacitor.

It is apparent from the foregoing that a new and improved metal detector has been provided. While only certain preferred embodiments have been described in detail as will be apparent to those familiar with the art, certain modifications and changes can be made without departing from the scope of the invention as defined by the following claims.

While the invention has been described with reference to specific embodiments, modifications and variations of the invention may be constructed without departing from the scope of the invention, which is defined in the following claims.

I claim:

1. A detector comprising:
    a metal detector which transmits energy from high voltage flyback pulses which occur at the termination of each of a continuous train of high current pulses;
    a transmit coil energized by the continuous train of high current pulses;
    a receive coil connected to a parallel capacitor forming a parallel tuned circuit;
    signal samplers and processor for sampling and processing signals intercepted by the receive coil; and
    indicators to alert the operator of the equipment when the signal processing yields results that meet predetermined criteria.

2. The detector of claim 1, wherein the transmit and receive coils are balanced for a minimum output from the receive coil when no metallic objects are in the transmitted magnetic field.

3. The detector of claim 1, wherein a reference burst or decaying sinusoidal oscillation is generated by a voltage pulsed directly into the receive coil at a time when signals from metallic objects are substantially zero.

4. The detector of claim 3, further comprising accurately measuring a cycle of the reference burst to produce accurate timing and sample demodulator clock pulse generation.

5. The detector of claim 3, further comprising deriving sampling pulses for the processing so that the signals intercepted by the receive coil are separated into resistive and reactive signal components.

6. The detector of claim 1, further comprising high pass filtering resistive and reactive signal components by using two differentiator circuits in each signal channel and causing an output indication only when both signals are of the same polarity thus indicating the presence of a non ferrous metallic object in the field produced by the transmit coil.

7. The detector of claim 6, further comprising tuning the differentiator circuits by a ganged potentiometers or electronic chip resistors.

8. The detector of claim 6, further comprising a display to display said ratio of the resistive and the reactive components of the metallic object as an indication as to the nature of the metallic object in the field of the searchcoil.

9. The method of metal detecting comprising:
    exciting a transmit coil of a metal detector with high current pulses;
    producing high voltage flyback pulses;

using the high voltage flyback pulses as a primary source of transmit energy;
intercepting signals from metallic objects in the transmitted magnetic field using a receive coil; and
tuning the receive coil to a resonant frequency with a parallel capacitor.

* * * * *